United States Patent
Hong

(10) Patent No.: US 11,259,175 B2
(45) Date of Patent: Feb. 22, 2022

(54) OVERHEATING PROTECTION METHOD FOR USER EQUIPMENT, DEVICE, USER EQUIPMENT, AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/618,287

(22) PCT Filed: Aug. 9, 2017

(86) PCT No.: PCT/CN2017/096678
§ 371 (c)(1),
(2) Date: Nov. 29, 2019

(87) PCT Pub. No.: WO2019/028714
PCT Pub. Date: Feb. 14, 2019

(65) Prior Publication Data
US 2020/0162891 A1    May 21, 2020

(51) Int. Cl.
*H04W 8/24* (2009.01)
*H04W 4/20* (2018.01)
(Continued)

(52) U.S. Cl.
CPC ............. *H04W 8/245* (2013.01); *H04W 4/20* (2013.01); *H04W 24/08* (2013.01); *H04W 72/048* (2013.01); *H04W 52/0212* (2013.01)

(58) Field of Classification Search
CPC ..... H04W 74/008; H04W 48/20; H04W 8/18; H04W 74/123; H04W 74/27; H04W 24/28
(Continued)

(56) References Cited

U.S. PATENT DOCUMENTS 8,699,364 B2 * 4/2014 Ishii .................... H04W 74/008
370/252
10,314,054 B2 * 6/2019 Pao ........................ H04L 5/001
(Continued)

FOREIGN PATENT DOCUMENTS

CN          101390431 A       3/2009
CN          102017493 A       4/2011
(Continued)

OTHER PUBLICATIONS

A Comprehensive Survey on Mobility Management in 5G Heterogeneous Networks: Architectures, Challenges and Solutions by Emre Gures; Ibraheem Shayea; Abdulraqeb Alhammadi; Mustafa Ergen; Hafizal Mohamad Published in: IEEE Access (vol. 8) Oct. 2020 (Year: 2020).*

(Continued)

*Primary Examiner* — William D Cumming
(74) *Attorney, Agent, or Firm* — Finnegan, Henderson, Farabow, Garrett & Dunner, L.L.P.

(57) ABSTRACT

An overheating protection method for user equipment includes: sending a first signaling to a base station, the first signaling carrying indication information indicating that the user equipment has a capability of report a temporary capability of the user equipment; monitoring whether the base station returns a second signaling on the basis of the first signaling within a preset time period; and determining whether the base station has the capability of solving overheating of the user equipment on the basis of a monitoring result.

14 Claims, 7 Drawing Sheets

(51) Int. Cl.
    *H04W 24/08* (2009.01)
    *H04W 72/04* (2009.01)
    *H04W 52/02* (2009.01)
(58) Field of Classification Search
    USPC .................................................. 370/258, 338
    See application file for complete search history.

(56) References Cited

U.S. PATENT DOCUMENTS

| | | | |
|---|---|---|---|
| 10,349,380 B2* | 7/2019 | Park | H04W 68/04 |
| 10,485,005 B2* | 11/2019 | Pao | H04B 7/0619 |
| 10,582,413 B2* | 3/2020 | Babaei | H04W 72/1284 |
| 10,582,560 B2* | 3/2020 | Park | H04W 8/18 |
| 10,863,380 B2* | 12/2020 | Babaei | H04W 72/1284 |
| 10,887,761 B2* | 1/2021 | Wu | H04W 36/08 |
| 10,973,007 B2* | 4/2021 | Zhou | H04W 72/08 |
| 2008/0046132 A1 | 2/2008 | Dalsgaard et al. | |
| 2009/0215442 A1 | 8/2009 | Lindoff et al. | |
| 2011/0110258 A1* | 5/2011 | Ishii | H04W 74/008 |
| | | | 370/252 |
| 2012/0039176 A1 | 2/2012 | Eshan et al. | |
| 2012/0113971 A1* | 5/2012 | Giaretta | H04W 48/20 |
| | | | 370/338 |
| 2013/0017851 A1 | 1/2013 | Kim | |
| 2013/0039173 A1 | 2/2013 | Ehsan et al. | |
| 2014/0226546 A1 | 8/2014 | Gupta et al. | |
| 2018/0034524 A1* | 2/2018 | Pao | H04L 1/1825 |
| 2018/0035438 A1* | 2/2018 | Pao | H04W 72/1231 |
| 2018/0255452 A1* | 9/2018 | Wu | H04W 8/24 |
| 2018/0270698 A1* | 9/2018 | Babaei | H04W 24/08 |
| 2018/0270699 A1* | 9/2018 | Babaei | H04W 72/1284 |
| 2018/0270791 A1* | 9/2018 | Park | H04W 8/24 |
| 2018/0270895 A1* | 9/2018 | Park | H04W 76/27 |
| 2018/0279262 A1* | 9/2018 | Babaei | H04W 72/04 |
| 2019/0335421 A1* | 10/2019 | Park | H04W 68/025 |
| 2020/0037334 A1* | 1/2020 | Pao | H04L 5/0053 |
| 2020/0162891 A1* | 5/2020 | Hong | H04W 4/20 |
| 2020/0169898 A1* | 5/2020 | Hong | G06F 1/206 |
| 2020/0174543 A1* | 6/2020 | Hong | H04L 69/28 |
| 2020/0196185 A1* | 6/2020 | Babaei | H04W 72/042 |
| 2020/0196379 A1* | 6/2020 | Park | H04W 24/04 |
| 2020/0221289 A1* | 7/2020 | Lee | H04L 5/001 |

FOREIGN PATENT DOCUMENTS

| | | |
|---|---|---|
| CN | 102460981 A | 5/2012 |
| CN | 103188388 A | 7/2013 |
| CN | 105467932 A | 4/2016 |
| CN | 106534506 A | 3/2017 |
| JP | 2011-514047 A | 4/2011 |
| JP | 2017-515375 A | 6/2017 |
| RU | 2510817 C2 | 4/2014 |
| TW | 201804852 A * | 2/2018 |
| WO | WO 2017/099891 A1 | 6/2017 |
| WO | WO2018130115 A1 * | 1/2018 |

OTHER PUBLICATIONS

DMME: A distributed LTE mobility management entity by Xueli An • Fabio Pianese • Indra Widjaja • Utku Gunay Acer Published in: Bell Labs Technical Journal (vol. 17, Issue: 2, pp. 97-120) Mar. 2014 (Year: 2014).*

Standardization of mobile phone positioning for 3G systems by Yilin Zhao Published in: IEEE Communications Magazine (vol. 40, Issue: 7, pp. 108-116) Jul. 1, 2002 (Year: 2002).*

Huawei, HiSilicon, *Consideration on NR UE capability*, R2-1701852, 3GPP TSG-RAN WG2#97, Athens, Greece, Feb. 13-17, 2017, 3 pgs.

Ericsson, *UE capacity principle and signalling*, R2-166782, 3GPP TSG-RAN WG2#95bis, Kaohsiung, Taiwan, Oct. 10-14, 2016, 4 pgs.

International Search Report of PCT Application No. PCT/CN2017/096678, dated Apr. 28, 2018.

Office Action of Russian Application No. 2019139723/07, dated Aug. 12, 2020.

Extended European Search Report in European Application No. 17920942.4 dated Mar. 19, 2021.

Notice of Reasons for Refusal from the Japanese Patent Action for counterpart Japanese Application No. 2020-505803 dated Jan. 28, 2021.

Notification of Reason for Refusal from the Korean Intellectual Property Office for counterpart Korean Application No. 10-2020-7006467 dated Mar. 12, 2021.

Catt, "UE capability temporary restrictions", 3GPP TSG-RAN WG2 Meeting, #NR AH2, R2-1706391, Qingdao, China, Jun. 27-29, 2017, 4 pages.

Huawei, "Report of email discussion [97 bis#07][LTE/TEI14} UE overheating problem", 3GPP TSG-RAN WG2 #98, R2-1705512, Hangzhou, China, May 15-19, 2017, 15 pages.

Xiaomi Communications, "On the UE overheating problem", 3GPP TSG-RAN WG2 Meeting #98, R2-1705386, Hangzhou, China, May 15-19, 2017, 3 pages.

Huawei, HiSilicon, MediaTek Inc., "Thermal issues with high capability UEs", 3GPP TSG-RAN WG2 #97, R2-1701835, Athens, Greece, Feb. 13-17, 2017, 5 pages.

LG Electronics Inc., "Assistance information for temporary capability restriction", 3GPP TSG-RAN2 Meeting #97, R2-1702952, Spokane, USA, Apr. 3-7, 2017, 3 pages.

Vivo, "UE radio access capabilities change", 3GPP TSG-RAN WG2 NR Ad Hoc, R2-1706979, Qingdao, China, Jun. 27-29, 2017, 3 pages.

Huawei, "Report of email discussion [98#43][LTE/TEI14} UE overheating problem", 3GPP TSG-RAN WG2 #99, R2-170XXXX, Berlin, Germany, Aug. 21-25, 2017, 16 pages.

Huawei device et al., "Introduction of the overheating indication", 3GPP TSG-RAN WG2 #99, R2-170XXXX, Berlin, Germany, Aug. 21-25, 2017, 54 pages.

Indian Office Action dated May 19, 2021, from Intellectual Property of India, in counterpart Indian Application No. 201927048825.

* cited by examiner

OVERHEATING PROTECTION METHOD FOR USER EQUIPMENT, DEVICE, USER EQUIPMENT, AND BASE STATION

CROSS REFERENCE TO RELATED APPLICATIONS

This application is a national phase application based on PCT/CN2017/096678, filed Aug. 9, 2017, the content of which is incorporated herein by reference.

TECHNICAL FIELD

The present disclosure relates to the field of wireless communication, and in particular, to an overheating protection method for user equipment, an overheating protection device for user equipment, user equipment and a base station.

BACKGROUND

In a Long Term Evolution (LTE) system, a wireless transmission means such as high-order multiple-input multiple-output (MIMO), multi-carrier aggregation or high-order modulation decoding can be provided for user equipment (UE), to meet user requirements for high-speed data transmission rates.

In the related art, in order to ensure a good experience when the user uses the UE, the UE provider generally performs temperature control on the mobile phone. For example, the UE can be controlled to reduce the wireless link configuration by means of detaching and reattaching to avoid UE overheating.

SUMMARY

According to a first aspect of an embodiment of the present disclosure, there is provided an overheating protection method for user equipment, applied to the user equipment having an overheating solving capability for the user equipment, the method including:

sending a first signaling to a base station, the first signaling carrying indication information indicating that the user equipment has a capability of reporting a temporary capability of the user equipment;

monitoring whether the base station returns a second signaling in response to the first signaling within a preset time period; and based on the monitoring result, determining whether the base station has an overheating solving capability for the user equipment.

According to a second aspect of an embodiment of the present disclosure, there is provided an overheating protection method for user equipment, applied to a base station, the method including:

receiving a first signaling sent by the user equipment, the first signaling carrying indication information indicating that the user equipment has a capability of reporting a temporary capability of the user equipment;

when the base station supports an overheating solving capability for the user equipment, generating a second signaling, the second signaling carrying indication information indicating the user equipment to report the capability of the temporary user equipment when the user equipment is overheated; and sending the second signaling.

According to a third aspect of an embodiment of the present disclosure, there is provided an overheating protection device for user equipment, applied to user equipment having an overheating solving capability for the user equipment, the device including:

a first sending module configured to send a first signaling to a base station, the first signaling carrying indication information indicating that the user equipment has a capability of reporting a temporary capability of the user equipment;

a monitoring module configured to monitor whether the base station returns a second signaling in response to the first signaling within a preset time period; and a first determining module configured to, based on the monitoring result, determine whether the base station has an overheating solving capability for the user equipment.

According to a fourth aspect of an embodiment of the present disclosure, there is provided an overheating protection device for user equipment, applied to a base station, the device including:

a first receiving module configured to receive a first signaling sent by the user equipment, the first signaling carrying indication information indicating that the user equipment has the capability of reporting the temporary capability of the user equipment;

a generating module configured to, when the base station supports an overheating solving capability for the user equipment, generate a second signaling, the second signaling carrying indication information indicating the user equipment to report the temporary capability of the user equipment when the user equipment is overheated; and a third sending module configured to send the second signaling.

According to a fifth aspect of an embodiment of the present disclosure, there is provided user equipment, including:

a processor.

a memory for storing processor executable instructions;

wherein the processor is configured to:

sending a first signaling to a base station, the first signaling carrying indication information indicating that the user equipment has a capability of reporting a temporary capability of the user equipment;

monitoring whether the base station returns a second signaling in response to the first signaling within a preset time period; and based on the monitoring result, determining whether the base station has an overheating solving capability for the user equipment.

According to a sixth aspect of an embodiment of the present disclosure, there is provided a base station, including:

a processor;

a memory for storing processor executable instructions;

wherein the processor is configured to:

receiving a first signaling sent by user equipment, the first signaling carrying indication information indicating that the user equipment has a capability of reporting a temporary capability of the user equipment;

when the base station supports an overheating solving capability for the user equipment, generating a second signaling, the second signaling carrying indication information indicating the user equipment to report the temporary capability of the user equipment when the user equipment is overheated; and sending the second signaling.

According to a seventh aspect of an embodiment of the present disclosure, there is provided a non-transitory computer readable storage medium having computer instructions stored thereon, wherein the instructions are executed by a processor to implement steps of:

sending a first signaling to a base station, the first signaling carrying indication information indicating that the user equipment has a capability of reporting a temporary capability of user equipment;

monitoring whether the base station returns a second signaling in response to the first signaling within a preset time period; and based on the monitoring result, determining whether the base station has an overheating solving capability for the user equipment.

According to an eighth aspect of an embodiment of the present disclosure, there is provided a non-transitory computer readable storage medium having computer instructions stored thereon, wherein the instructions are executed by a processor to implement steps of:

receiving a first signaling sent by user equipment, the first signaling carrying indication information indicating that the user equipment has a capability of reporting a temporary capability of the user equipment;

when the base station supports an overheating solving capability for the user equipment, generating a second signaling, the second signaling carrying indication information indicating the user equipment to report the temporary capability of the user equipment when the user equipment is overheated; and sending the second signaling.

The technical solutions provided by the embodiments of the present disclosure can include the following beneficial effects.

User equipment having an overheating solving capability for the user equipment may send a first signaling to a base station, the first signaling carrying indication information indicating that the user equipment has a capability of reporting a temporary capability of the user equipment; and, based on a monitoring result within a preset time period, determine whether the base station has an overheating solving capability for the user equipment. Thereby, the base station and the user equipment can determine whether the other party has an overheating solving capability for the UE through the signaling interaction between the base station and the user equipment. Further, upon determining that both of the user equipment and the base station to which the user equipment accesses have an overheating solving capability for the UE, the device temperature of the user equipment can be lowered with the aid of the base station without interrupting transmission of service data.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
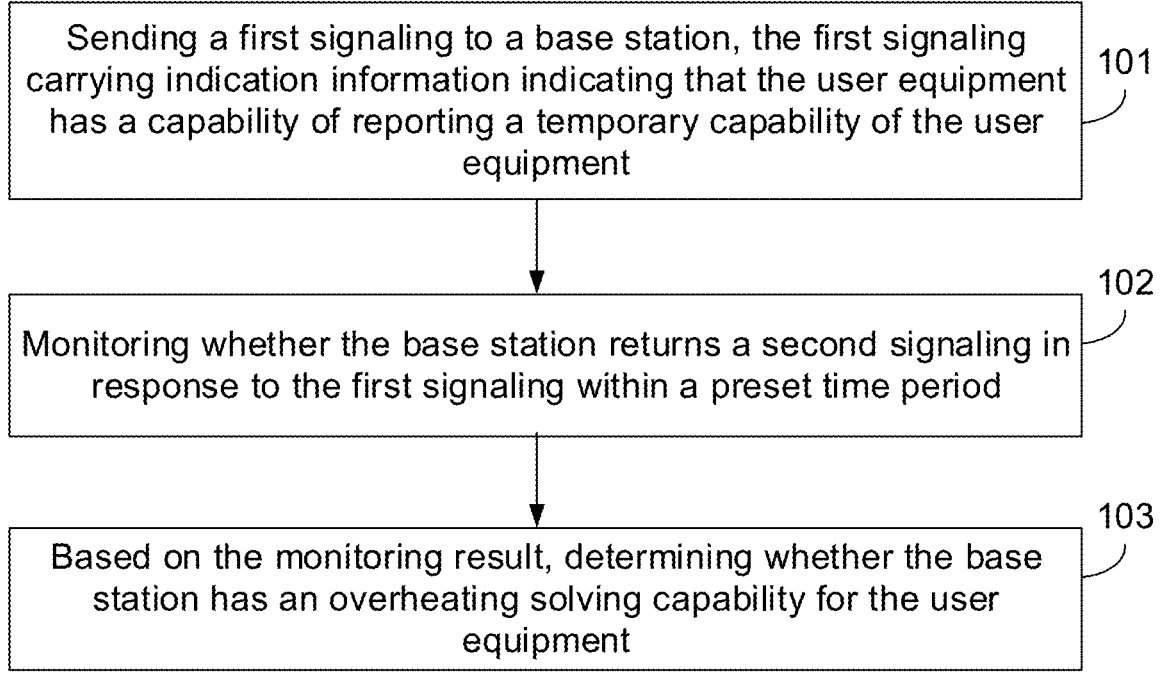
FIG. 1A is a flowchart of an overheating protection method for user equipment according to an exemplary embodiment.
Figure 1B:
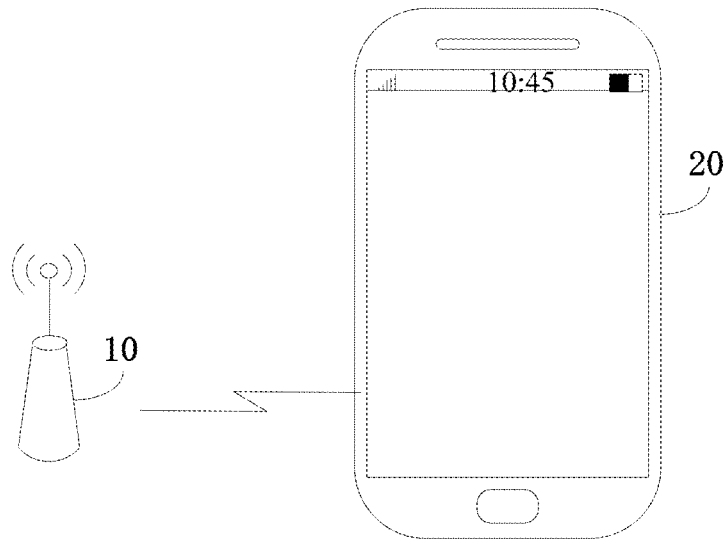
FIG. 1B is a diagram of a scenario of an overheating protection method for user equipment according to an exemplary embodiment.

FIG. 1A is a flowchart of an overheating protection method for user equipment according to an exemplary embodiment, and FIG. 1B is a diagram of a scenario of an overheating protection method for user equipment according to an exemplary embodiment. The overheating protection method for user equipment can be applied to the user equipment. As shown in FIG. 1A, the overheating protection method for user equipment includes the following steps 101-103.

In step 101, a first signaling is sent to a base station, the first signaling carrying indication information indicating that the user equipment has a capability of reporting a temporary capability of the user equipment.

In an embodiment, the first signaling may be other parameter Other-Parameters-v14xy signaling in a UE-EUTRA-Capability signaling of the UE for reporting network capabilities supported by the UE. By adding temporary UE capability indication information tempUECapability-r14 in the Other-Parameters-v14xy signaling, to indicate that the user equipment has a capability of reporting a temporary capability of the user equipment. In an embodiment, the temporary capability of the user equipment can be understood as a network capability temporarily supported by the UE when it is overheated. The first signaling can be the following codes as reference:

```
OtherConfig-r9 ::= SEQUENCE {
    [[ bw-Config-r14          BW-Config-r14      OPTIONAL,-- Need ON
        bandwidth configuration
        sps-AssistanceInfoReport-r14 ENUMERATED {allowed} OPTIONAL,
        SPS assistance information reporting            -- Need ON
        delayBudgetReportingConfig-r14 DelayBudgetReportingConfig-r14
        delay budget reporting configuration  OPTIONAL  -- Need ON
        tempUECapabilityConfig-r14 TempUECapabilityConfig-r14
        temporary UE capability configuration OPTIONAL  -- Need ON
    ]]
tempUECapabilityConfig-r14 ::= CHOICE{
    release                     NULL,
    release
    setup                       SEQUENCE{
    setup
    overheatingIndicationTimer-r14 ENUMERATED {s0, s0dot5, s1, s2, s5,
        overheating prevention timer           s10, s20, s30, s60, s90,
                                               s120, s300, s600, spare3,
                                               spare2, spare1}
    }
  }
}
```

```
Other-Parameters-v14xy ::= SEQUENCE {
    bwPrefInd-r14       ENUMERATED {supported} OPTIONAL
    tempUECapability-r14 ENUMERATED {supported} OPTIONAL
}
```

In step 102, it is monitored whether the base station returns a second signaling in response to the first signaling within a preset time period.

In an embodiment, the preset time period may be determined by a preset timer with a timing length being the preset time period. The preset timer is started after the request message is sent, and it is monitored whether a response message is received before the preset timer expires.

In an embodiment, the second signaling may be one of other configuration OtherConfig signaling in the Radio Resource Control (RRC) connection reconfiguration RRC-ConnectionReconfiguration signaling, for example, may be named as temporary UE capability configuration signaling tempUECapabilityConfig-r14. Through the tempUECapabilityConfig-r14 signaling, the user equipment can report a temporary UE capability when an overheating problem occurs. That is, through the tempUECapabilityConfig-r14 signaling, the user equipment can be indicated that the base station has an overheating solving capability for the user equipment.

In an embodiment, the base station may further carry an overheating prevention timer and a time length overheatingIndicationTimer-r14 of the timer in the tempUECapabilityConfig-r14 signaling. Upon receiving the second signaling, the user equipment can parse the second signaling to obtain the time period length of the overheating prevention timer, send a third signaling for adjusting wireless link configuration when overheating, and after that, start the overheating prevention timer to determine a sending time for resending a signaling for adjusting wireless link configuration. For example, if the user equipment is still overheated after the timer expires, the time when the timer expires may be determined as a sending time for resending a signaling for adjusting wireless link configuration, to avoid that the user equipment sends a signaling for adjusting wireless link configuration too frequently. The second signaling can be the following codes for reference:

In step 103, based on the monitoring result, it is determined whether the base station has an overheating solving capability for the user equipment.

In an embodiment, if the monitoring result indicates that a second signaling is monitored, it can be determined that the base station also has the overheating solving capability for the user equipment. In another embodiment, if the monitoring result indicates that no second signaling is monitored, it can be determined that the base station does not have the overheating solving capability for the user equipment.

In an exemplary scenario, as shown in FIG. 1B, in the scenario shown in FIG. 1B, a base station 10, user equipment (such as a smart phone, a tablet, and the like) 20 are included. When the user equipment 20 has an overheating solving capability for UE, the user equipment 20 may send a first signaling to the base station 10, the first signaling carrying indication information indicating that the user equipment 20 has a capability of reporting a temporary capability of the user equipment. If the base station 10 also has an overheating solving capability for UE, the base station 10 may send a second signaling, otherwise the base station 10 does not respond, thereby implementing signaling interaction between the base station and the user equipment for determining whether the other party has an overheating solving capability for the UE.

In this embodiment, through the foregoing steps 101-103, the base station and the user equipment cam determine whether the other party has an overheating solving capability for the UE through the signaling interaction between the base station and the user equipment. Further, upon determining that both of the user equipment and the base station to which the user equipment accesses have an overheating solving capability for the UE, the device temperature of the user equipment can be lowered with the aid of the base station without interrupting transmission of service data.

In an embodiment, based on the monitoring result, determining whether the base station has an overheating solving capability for the user equipment includes:

when the monitoring result is that a second signaling is monitored, determining that the base station has the overheating solving capability for the user equipment;

when the monitoring result is that no second signaling is monitored, determining that the base station does not have the overheating solving capability for the user equipment.

In an embodiment, the second signaling carries indication information indicating the user equipment to report a temporary capability of the user equipment when the user equipment is overheated.

In an embodiment, the overheating protection method for user equipment may further include:

upon determining that the base station has an overheating solving capability for the user equipment, when the user equipment is overheated due to wireless link configuration being too high, a third signaling for adjusting wireless link configuration is sent to the base station, and the third signaling carries assistance information indicating the base station to solve the overheating problem of the user equipment.

In an embodiment, the assistance information includes:

indication information of lower performance due to overheating; and/or a temporary user equipment capability due to overheating, which is represented by a user equipment type; and/or a temporary user equipment capability due to overheating, which is represented by a radio frequency parameter.

In an embodiment, the method for overheating protection of the user equipment may further include:

parsing the second signaling to obtain a time period length of an overheating prevention timer; and based on the time period length, determining a sending time for resending a signaling for adjusting wireless link configuration to the base station after the third signaling is sent.

For details on how to protect the user equipment from overheating, please refer to the following examples.

The technical solutions provided by the embodiments of the present disclosure are described below with reference to specific embodiments.

Figure 2:
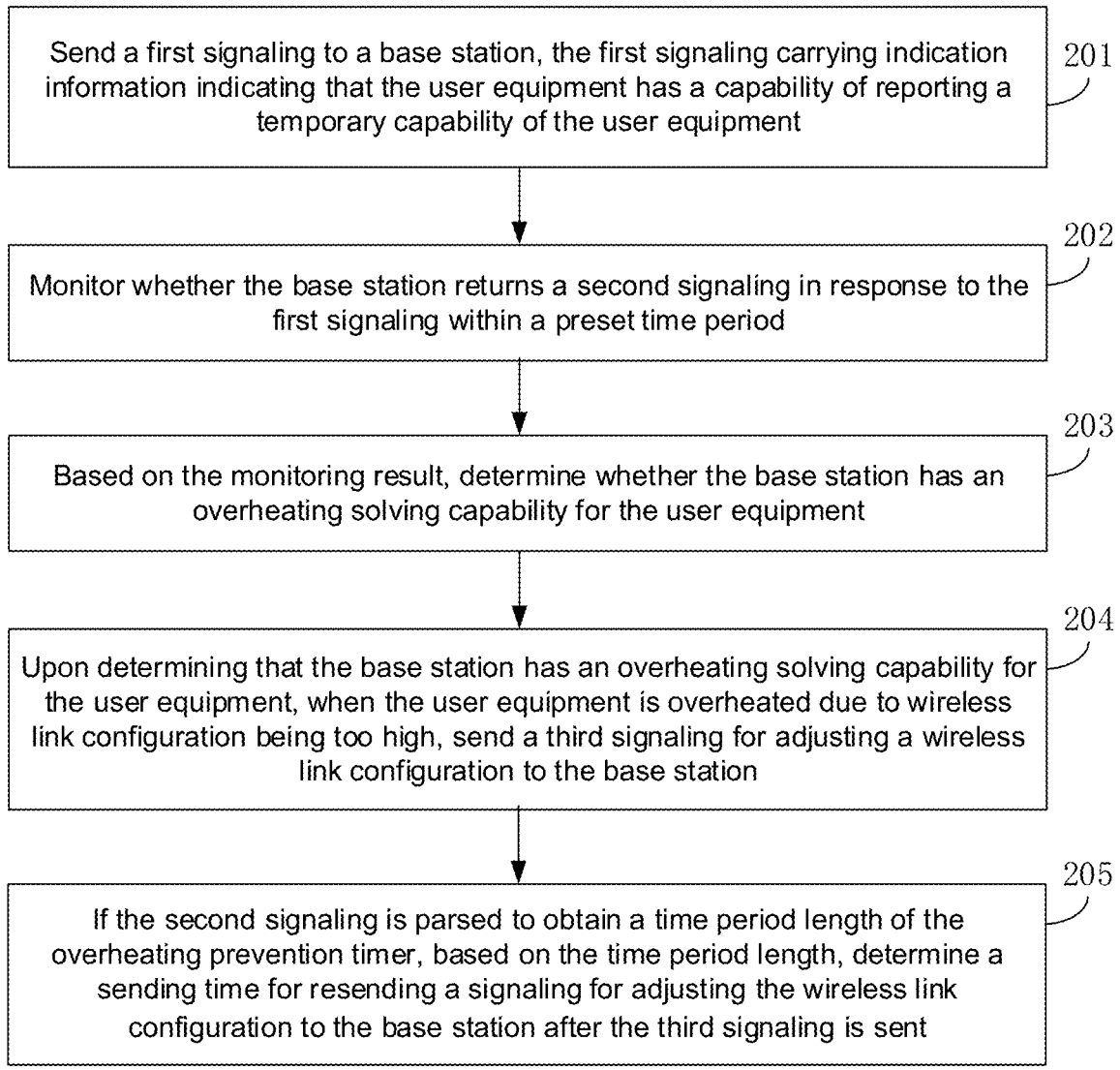
FIG. 2 is a flowchart of another overheating protection method for user equipment according to an exemplary embodiment.

FIG. 2 is a flowchart of another overheating protection method for user equipment according to an exemplary embodiment. This embodiment uses the foregoing method provided by the embodiment of the present disclosure to illustrate an example of how to implement overheating protection for user equipment. As shown in FIG. 2, it includes the following steps.

In step 201, a first signaling is sent to the base station, the first signaling carrying indication information indicating that the user equipment has a capability of reporting a temporary capability of the user equipment.

In step 202, it is monitored whether the base station returns a second signaling in response to the first signaling within a preset time period.

In step 203, based on the monitoring result, it is determined whether the base station has an overheating solving capability for the user equipment. When the base station has an overheating solving capability for the user equipment, step 204 is performed.

In an embodiment, when the monitoring result is that a second signaling is monitored, it is determined that the base station has the overheating solving capability for the user equipment. In another embodiment, when the monitoring result is that no second signaling is monitored, it is determined that the base station does not have the overheating solving capability for the user equipment.

In an embodiment, the description of step 201-step 203 can be referred to the description of step 101-step 103 of the embodiment shown in FIG. 1A, details of which will not be repeated herein.

In step 204, upon determining that the base station has the overheating solving capability for the user equipment, when the user equipment is overheated due to the wireless link configuration being too high, a third signaling for adjusting wireless link configuration is sent to the base station.

In an embodiment, the third signaling may be UEAssistanceInformation signaling. In an embodiment, the third signaling carries assistance information indicating the base station to solve the overheating problem of the user equipment, and the assistance information may include indication information of lower performance Lower-Performance due to overheating; and/or a temporary user equipment capability due to overheating, which represented by a user equipment type ue-Category; and/or a temporary user equipment capability due to overheating, which is represented by a radio frequency parameter rf-Parameters-v14xy. The third signaling can be the following codes as reference:

```
UEAssistanceInformation-r11 ::=SEQUENCE {
UE assistance information
      criticalExtensions              CHOICE {
          c1                             CHOICE {
              ueAssistanceInformation-r11 UEAssistanceInformation-r11-IEs,
              spare3 NULL, spare2 NULL, spare1 NULL
          },
          criticalExtensionsFuture       SEQUENCE { }
      }
}
UEAssistanceInformation-r11-IEs ::= SEQUENCE {
      powerPrefIndication-r11             ENUMERATED {normal,
                                          lowPowerConsumption} OPTIONAL,
      lateNonCriticalExtension            OCTET STRING       OPTIONAL,
      nonCriticalExtension                UEAssistanceInformation-v14xy-IEs
                                                                     OPTIONAL
}
UEAssistanceInformation-v14xy-IEs ::=       SEQUENCE{
      bw-Preference-r14                   BW-Preference-r14
      bandwidth expectation                              OPTIONAL,
      sps-AssistanceInformation-r14       SPS-AssistanceInformation-r14
      SPS assistance information                         OPTIONAL
      temp-UE-Capability-r14              Temp-UE-Capability-r14 OPTIONAL
      temporary UE capabilities
      nonCriticalExtension                SEQUENCE { } OPTIONAL
}
```

```
Temp-UE-Capability-r14-IEs ::=        SEQUENCE{
temporary UE capabilities
    Lower-Performance                 BOOLEAN          OPTIONAL,
low performance
    ue-Category                       INTEGER (1..5)   OPTIONAL,
    UE type
    rf-Parameters-v14xy               RF-Parameters-v14xyOPTIONAL,
    RF parameters
    nonCriticalExtension              SEQUENCE { }                 OPTIONAL
}
```

In step 205, if the second signaling is parsed to obtain a time period length of the overheating prevention timer, based on the time period length, it is determined a sending time for resending a signaling for adjusting wireless link configuration to the base station after a third signaling is sent.

In an embodiment, after the third signaling is sent, the overheating prevention timer can be started, and after the timer expires, if the user equipment is still overheated, the time when the timer expires may be determined as a sending time for resending a signaling for adjusting wireless link configuration to the base station. If the user equipment is no longer overheated when the timer expires, the time when the user equipment is overheated again may be determined as a sending time for sending a signaling for adjusting wireless link configuration to the base station.

In an embodiment, based on the overheating prevention timer, it is possible to avoid the waste of signaling resources caused by the user equipment frequently sending a signaling for adjusting wireless link configuration to the base station.

In this embodiment, when the user equipment determines that the base station also supports an overheating solving capability for UE, the user equipment may send signaling for adjusting the wireless link configuration to the base station when the user equipment is overheated. It is possible to avoid the waste of signaling resources caused when the user equipment sends a signaling for adjusting wireless link configuration to the base station when the base station does not support an overheating solving capability for UE. In addition, by setting the overheating prevention timer, it is possible to avoid the waste of signaling resources caused by the user equipment frequently sending a signaling to the base station.

Figure 3:
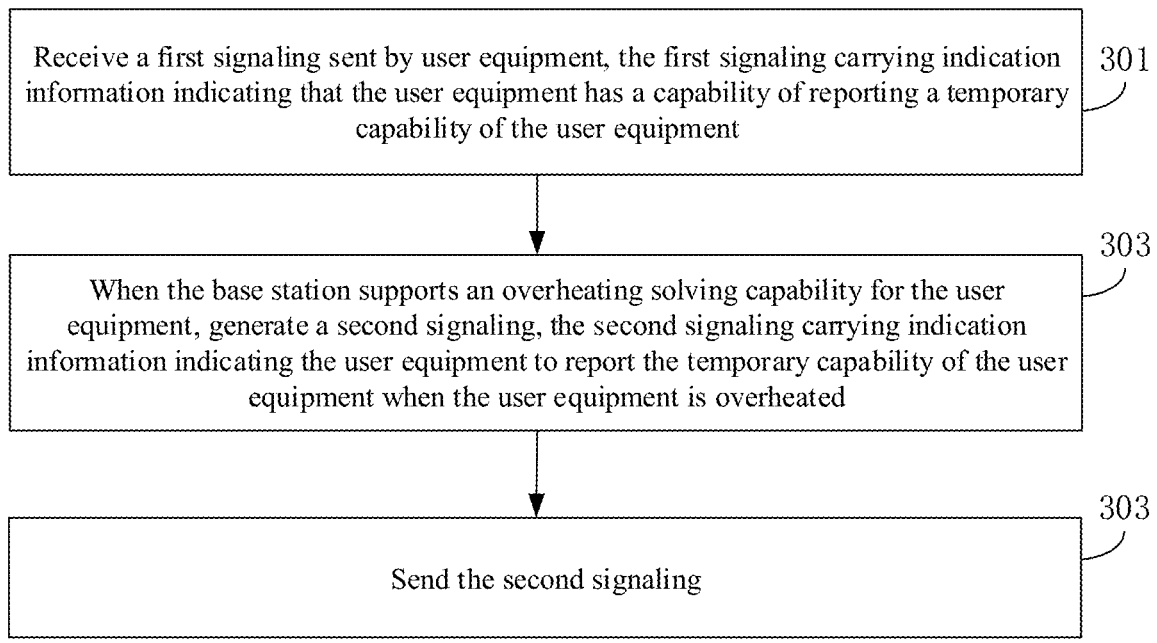
FIG. 3 is a flowchart of an overheating protection method for user equipment according to an exemplary embodiment.

FIG. 3 is a flowchart of an overheating protection method for user equipment according to an exemplary embodiment, and the overheating protection method for user equipment may be applied to a base station. As shown in FIG. 3, the overheating protection method includes the following steps 301-303.

In step 301, a first signaling sent by user equipment is received, the first signaling carrying indication information indicating that the user equipment has a capability of reporting a temporary capability of the user equipment.

In an embodiment, the first signaling may be other parameter Other-Parameters-v14xy signaling in a UE-EUTRA-Capability signaling of the UE for reporting network capabilities supported by the LE. By adding the temporary UE capability indication information tempUECapability-r14 in the Other-Parameters-v14xy signaling, to indicate that the user equipment has a capability of reporting a temporary capability of the user equipment. In an embodiment, the temporary capability of the user equipment can be understood as a network capability temporarily supported by the UE when it is overheated.

In step 302, when the base station supports an overheating solving capability for the user equipment, a second signaling is generated, the second signaling carrying indication information indicating the user equipment to report the temporary capability of the user equipment when the user equipment is overheated.

In an embodiment, the second signaling may be one of other configuration OtherConfig signaling in the Radio Resource Control RRC connection reconfiguration RRCConnectionReconfiguration signaling. By adding a signaling, such as a temporary UE capability configuration signaling tempUECapabilityConfig-r14, in the OtherConfig signaling, to indicate that the user equipment can report a temporary UE capability when an overheating problem occurs. That is, through the tempUECapabilityConfig-r14 signaling, the user equipment can be indicated that the base station has an overheating solving capability for the user equipment.

In an embodiment, the second signaling further carries a time period length of an overheating prevention timer.

In step 303, the second signaling is sent.

In an embodiment, when the base station does not support the overheating solving capability for the user equipment, the base station may reject sending a second signaling to the user equipment.

In an exemplary scenario, as shown in FIG. 1B, in the scenario shown in FIG. 1B, a base station 10, user equipment (such as a smart phone, a tablet, and the like) 20 are included. When the user equipment 20 has an overheating solving capability for UE, the user equipment 20 may send a first signaling to the base station 10, and the first signaling carries indication information indicating that the user equipment 20 has a capability of reporting a temporary capability of the user equipment. If the base station 10 also has an overheating solving capability for UE, the base station 10 may send a second signaling, otherwise the base station 10 does not respond, thereby implementing signaling interaction between the base station and the user equipment for determining whether the other party has an overheating solving capability for the UE.

In this embodiment, through the foregoing steps 101-103, the base station and the user equipment can determine whether the other party has an overheating solving capability for the UE through the signaling interaction between the base station and the user equipment. Further, upon determining that both of the user equipment and the base station to which the user equipment accesses have an overheating solving capability for the UE, the device temperature of the user equipment can be lowered with the aid of the base station without interrupting transmission of service data.

In an embodiment, the second signaling further carries a time period length of an overheating prevention timer.

In an embodiment, the overheating protection method for user equipment may further include:

when the base station does not support the overheating solving capability for the user equipment, the base station rejects sending a second signaling to the user equipment.

In an embodiment, the overheating protection method for user equipment may further include:

receiving a third signaling sent by the user equipment;

parsing the third signaling to obtain assistance information indicating to solve the overheating problem of the user equipment; and adjusting the wireless link configuration of the user equipment based on the assistance information.

In an embodiment, the assistance information includes:

indication information of lower performance due to overheating; and/or a temporary user equipment capability due to overheating, which is represented by a user equipment type; and/or a temporary user equipment capability due to overheating, which is represented by a radio frequency parameter.

For details on how to protect the user equipment from overheating, please refer to the following embodiments.

The technical solutions provided by the embodiments of the present disclosure are described below with reference to specific embodiments.

Figure 4:
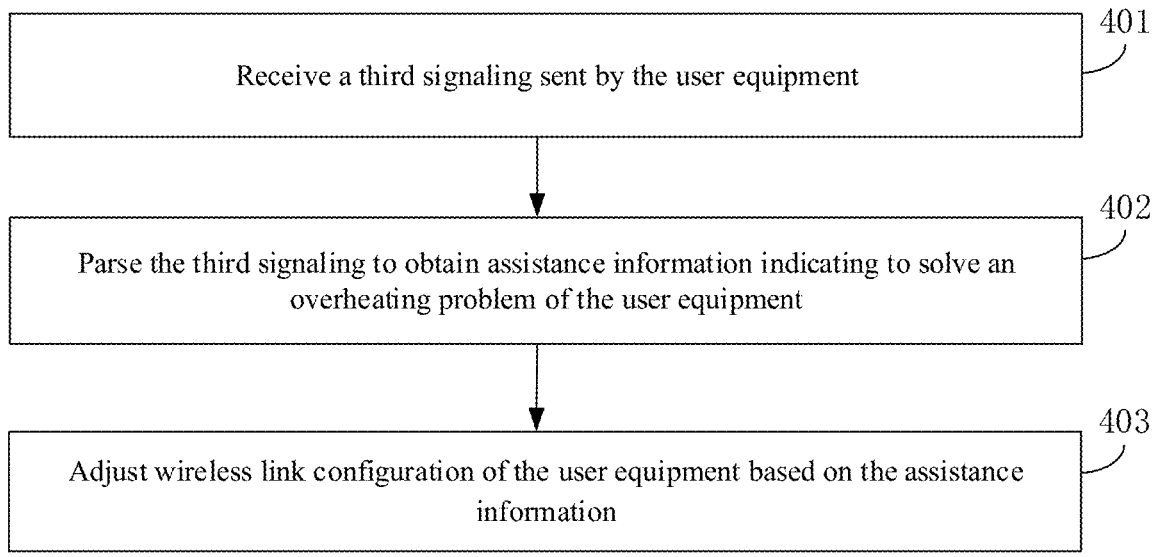
FIG. 4 is a flowchart of another overheating protection method for user equipment according to an exemplary embodiment.

FIG. 4 is a flowchart of another overheating protection method for user equipment according to an exemplary embodiment. This embodiment uses the foregoing method provided by the embodiment of the present disclosure to illustrate an example of how to adjust the wireless link configuration when the base station receives a third signaling sent by the user equipment requesting the base station to solve the overheating problem of the UE. As shown in FIG. 4, it includes the following steps.

In step 401, a third signaling sent by the user equipment is received.

In step 402, the third signaling is parsed to obtain assistance information indicating to solve the overheating problem of the user equipment.

In an embodiment, the third signaling carries assistance information indicating the base station to solve the overheating problem of the user equipment, and the assistance information may include indication information of underperformance due to overheating; and/or a temporary user equipment capability due to overheating, which is represented by a user equipment type; and/or a temporary user equipment capability due to overheating, which is represented by a radio frequency parameter.

In an embodiment, the temporary user equipment capability due to overheating, which is represented by a user equipment type can be understood as a temporary user equipment capability corresponding to the user equipment type. If the system stipulates a temporary user equipment capability when the user equipment is overheated for a certain type of user equipment, the base station may determine the temporary user equipment capability according to the user equipment type in the third signaling. In an embodiment, a temporary user equipment capability due to overheating, which is represented by a radio frequency parameter can be understood as a temporary user equipment capability corresponding to the radio frequency parameter. If the system stipulates the temporary user equipment capability when the user equipment is overheated for a certain type of user equipment, the base station may determine the temporary user equipment capability according to the radio frequency parameter in the third signaling.

In step 403, the wireless link configuration of the user equipment is adjusted based on the assistance information.

In an embodiment, the base station may first determine the wireless link configuration information of the user equipment to be adjusted based on the assistance information, and then the wireless link configuration of the user equipment is adjusted.

In this embodiment, through the above steps 401-403, the base station can adjust the wireless link configuration of the user equipment based on the third signaling sent by the user equipment, and prevent the user equipment from being interrupted in transmission of service data due to overheating.

Figure 5:
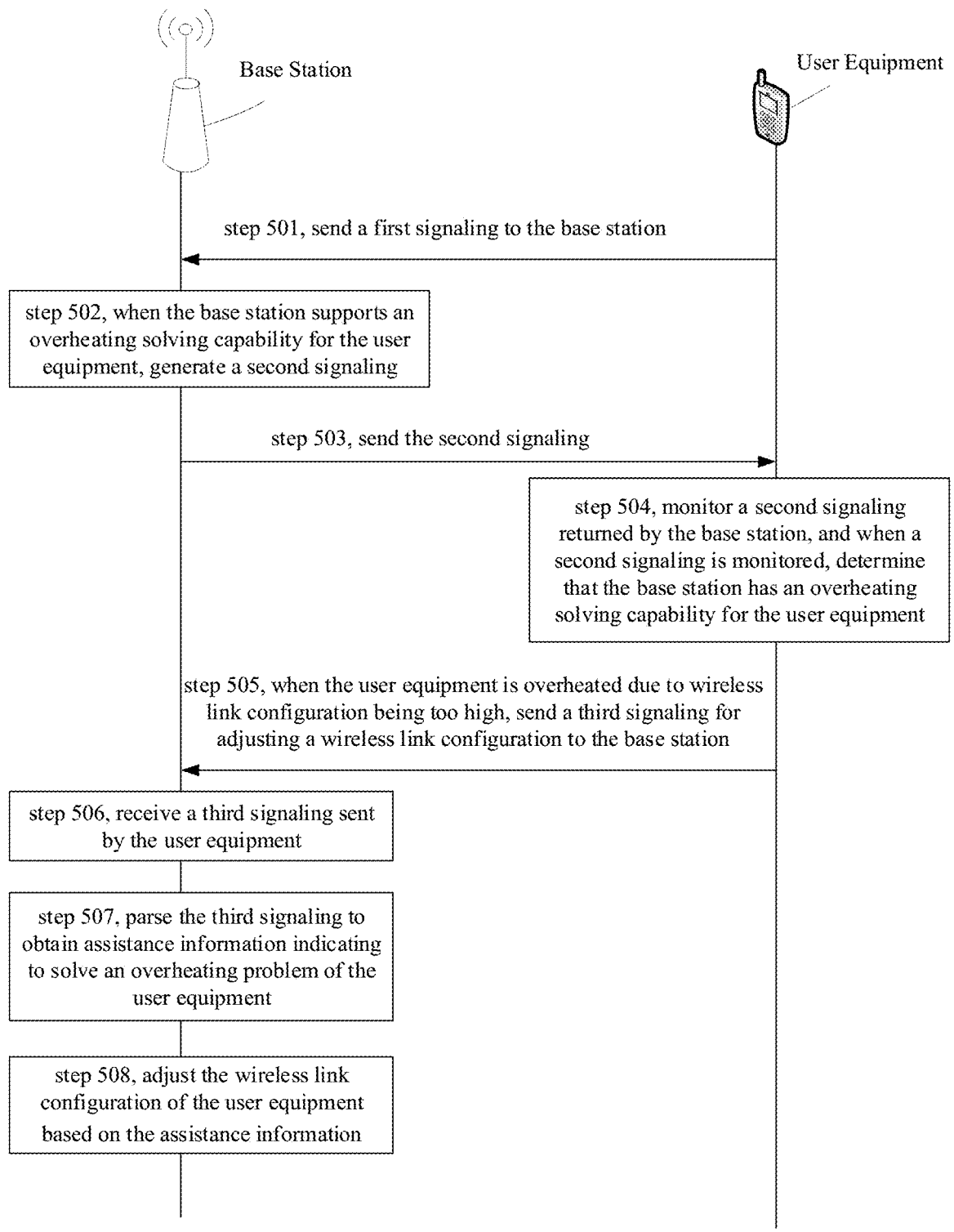
FIG. 5 is a flowchart of a method of interaction between a base station and user equipment to implement overheating protection for the user equipment according to an exemplary embodiment.

FIG. 5 is a flowchart of another overheating protection method for user equipment according to an exemplary embodiment. This embodiment uses the foregoing method provided by the embodiment of the present disclosure to illustrate an example of the base station and the user equipment interact to implement overheating protection of the user equipment. As shown in FIG. 5, it includes the following steps.

In step 501, the user equipment sends a first signaling to the base station.

In an embodiment, the first signaling carries indication information indicating that the user equipment has a capability of reporting a temporary capability of the user equipment.

In step 502, when the base station supports an overheating solving capability for the user equipment, a second signaling is generated.

In an embodiment, the second signaling carries indication information indicating the user equipment to report a temporary capability of the user equipment when the user equipment is overheated.

In an embodiment, the base station rejects sending a second signaling when the base station does not support an overheating solving capability for the user equipment, and the process ends.

In step 503, the base station sends the second signaling.

In step 504, the user equipment monitors a second signaling returned by the base station, and when a second signaling is monitored, it is determined that the base station has the overheating solving capability for the user equipment.

In step 505, when the user equipment is overheated due to the wireless link configuration being too high, a third signaling for adjusting wireless link configuration is sent to the base station.

In step 506, the base station receives the third signaling sent by the user equipment.

In step 507, the base station parses the third signaling to obtain assistance information indicating to solve the overheating problem of the user equipment.

In step 508, the base station adjusts the wireless link configuration of the user equipment based on the assistance information.

In this embodiment, through the foregoing steps 501-508, it is realized the base station and the user equipment determine whether the other party is provided with the UE overheating solving capability through the signaling interaction between the base station and the user equipment Further, upon determining that both of the user equipment and the base station to which the user equipment accesses have an overheating solving capability for the UE, the device temperature of the user equipment can be lowered with the aid of the base station without interrupting transmission of service data.

Figure 6:
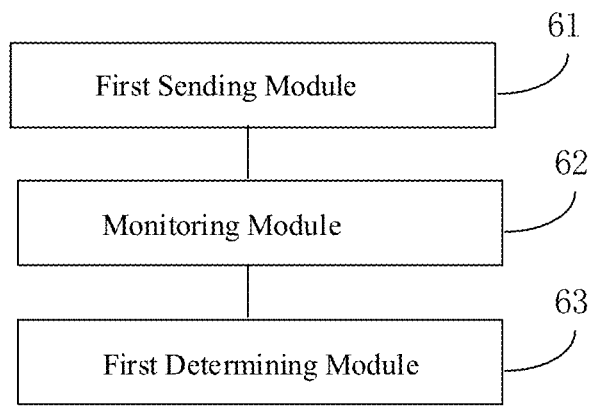
FIG. 6 is a block diagram of an overheating protection device for user equipment according to an exemplary embodiment.

FIG. 6 is a block diagram of an overheating protection device 600 for user equipment according to an exemplary embodiment, and the device is applied to the user equipment. As shown in FIG. 6, the overheating protection device for user equipment includes:

a first sending module 61 configured to send a first signaling to a base station, the first signaling carrying indication information indicating that the user equipment has a capability of reporting a temporary capability of the user equipment;

a monitoring module 62 configured to monitor whether the base station returns a second signaling in response to the first signaling within a preset time period; and a first determining module 63 configured to, based on the monitoring result, determine whether the base station has an overheating solving capability for the user equipment.

Figure 7:
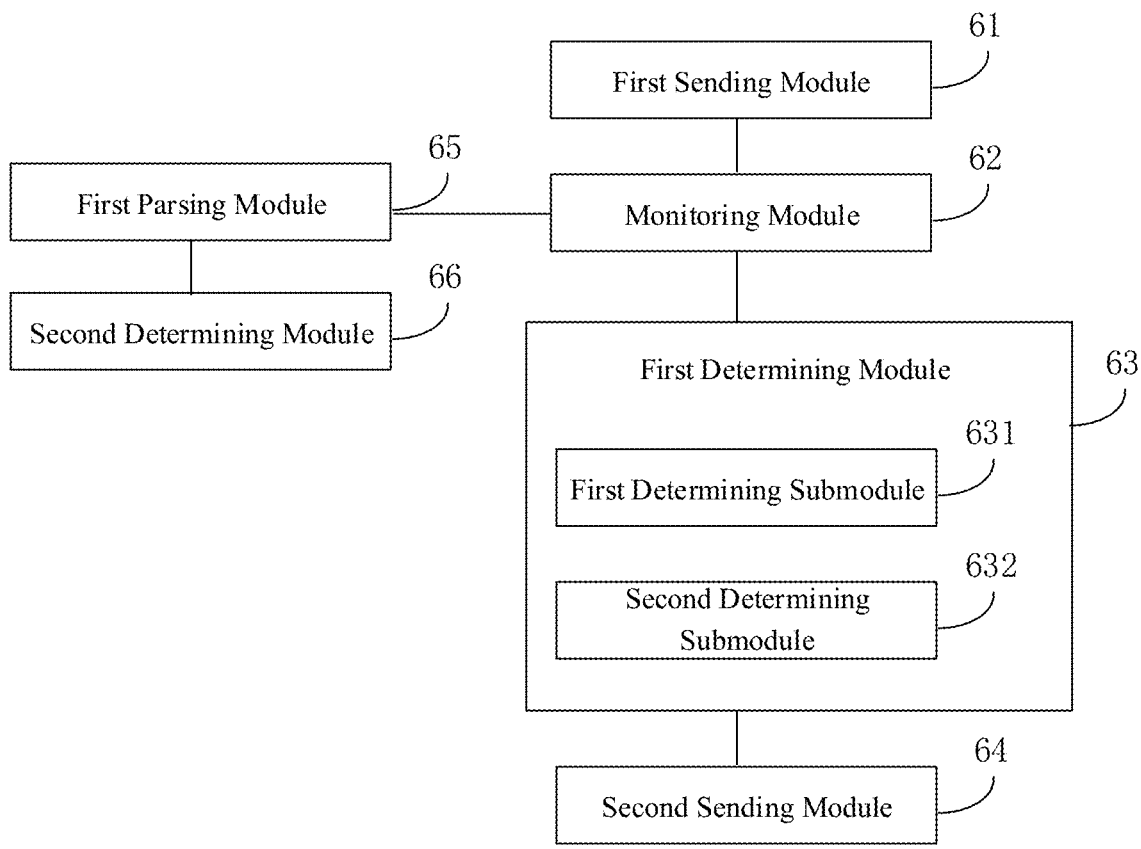
FIG. 7 is a block diagram of another type of overheating protection device for user equipment according to an exemplary embodiment.

FIG. 7 is a block diagram of another type of overheating protection device for user equipment according to an exemplary embodiment. As shown in FIG. 7, based on the embodiment of FIG. 6, in an embodiment, the first determining module 63 includes:

a first determining submodule 631 configured to, when the monitoring result is that a second signaling is monitored, determine that the base station has the overheating solving capability for the user equipment; and a second determining submodule 632 configured to, when the monitoring result is that no second signaling is monitored, determine that the base station does not have the overheating solving capability for the user equipment.

In an embodiment, the second signaling carries indication information indicating the user equipment to report a temporary capability of the user equipment when the user equipment is overheated.

In an embodiment, the device further includes:

a second sending module 64 configured to, upon determining that the base station has an overheating solving capability for the user equipment, when the user equipment is overheated due to wireless link configuration being too high, send a third signaling for adjusting wireless link configuration to the base station, the third signaling carrying assistance information indicating the base station to solve the overheating problem of the user equipment.

In an embodiment, the assistance information includes:

indication information of lower performance due to overheating, and/or a temporary user equipment capability due to overheating, which is represented by a user equipment type; and/or a temporary user equipment capability due to overheating, which is represented by a radio frequency parameter.

In an embodiment, the device further includes:

a first parsing module 65 configured to parse the second signaling to obtain a time period length of an overheating prevention timer; and a second determining module 66 configured to, based on the time period length, determine a sending time for resending a signaling for adjusting wireless link configuration to the base station after the third signaling is sent.

Figure 8:
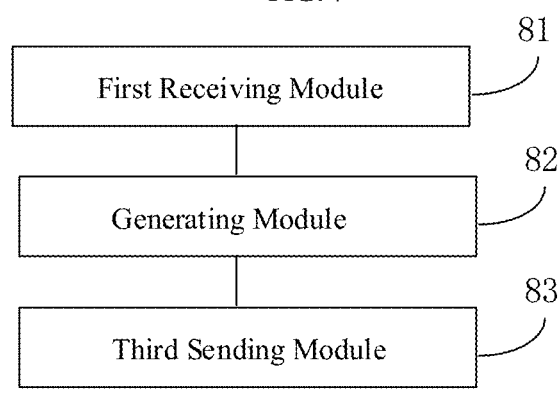
FIG. 8 is a block diagram of an overheating protection device for user equipment according to an exemplary embodiment.

FIG. 8 is a block diagram of an overheating protection device for user equipment according to an exemplary embodiment, and the device is applied to a base station. As shown in FIG. 8, the overheating protection device for user equipment includes:

a first receiving module 81 configured to receive a first signaling sent by user equipment, the first signaling carrying indication information indicating that the user equipment has a capability of reporting a temporary capability of the user equipment;

a generating module 82 configured to, when the base station supports an overheating solving capability for the user equipment, generate a second signaling, the second signaling carrying indication information indicating the user equipment to report the temporary capability of the user equipment when the user equipment is overheated; and a third sending module 83 configured to send the second signaling.

Figure 9:
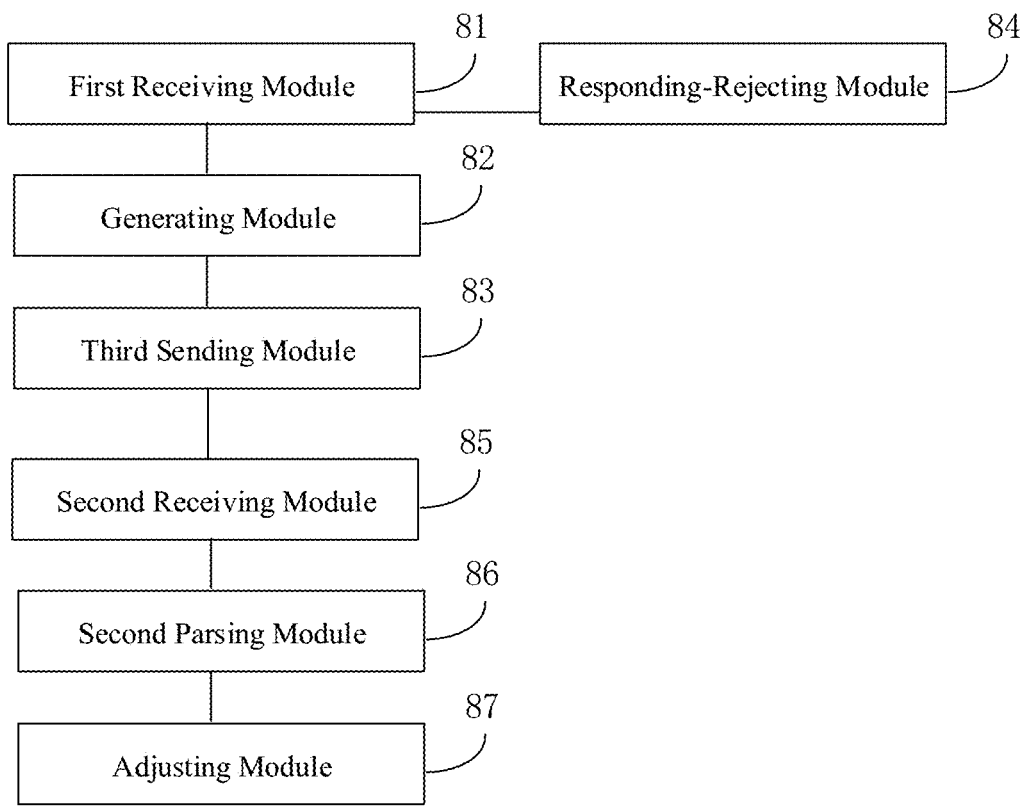
FIG. 9 is a block diagram of another overheating protection device for user equipment according to an exemplary embodiment.

FIG. 9 is a block diagram of another overheating protection device for user equipment according to an exemplary embodiment. As shown in FIG. 9, based on the embodiment of FIG. 8, in an embodiment, the second signaling further carries a time period length of an overheating prevention timer.

In an embodiment, the device further includes:

a responding-rejecting module 84 configured to, when the base station does not support the overheating solving capability for the user equipment, reject sending a second signaling to the user equipment.

In an embodiment, the device further includes:

a second receiving module 85 configured to receive a third signaling sent by the user equipment;

a second parsing module 86 configured to parse the third signaling to obtain assistance information indicating to solve an overheating problem of the user equipment; and an adjusting module 87 configured to adjust wireless link configuration of the user equipment based on the assistance information.

In an embodiment, the assistance information includes:

indication information of lower performance due to overheating; and/or a temporary user equipment capability due to overheating, which is represented by a user equipment type; and/or a temporary user equipment capability due to overheating, which is represented by a radio frequency parameter.

With regard to the device in the above embodiments, the specific manner in which the respective modules perform the operations has been described in detail in the embodiments relating to the method, details of which will not be repeated herein.

Figure 10:
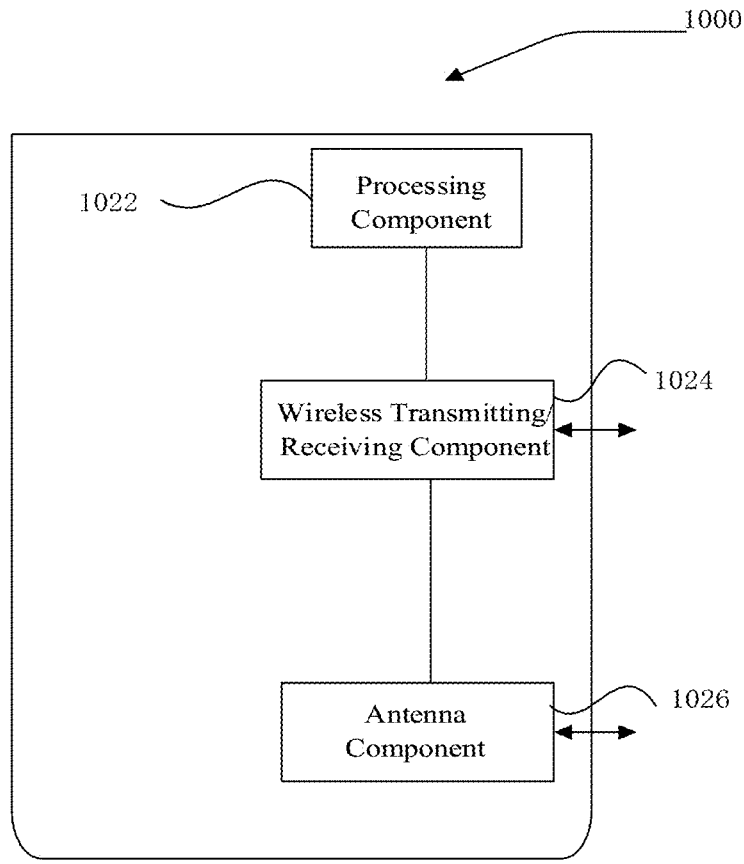
FIG. 10 is a block diagram of an overheating protection device suitable for user equipment according to an exemplary embodiment.

FIG. 10 is a block diagram of an overheating protection device suitable for user equipment according to an exemplary embodiment. The device 1000 can be provided as a base station. Referring to FIG. 10, the device 1000 includes a processing component 1022, a wireless transmitting/receiving component 1024, an antenna component 1026, and a signal processing portion specific to a wireless interface. The processing component 1022 can further include one or more processors.

One processor of the processing components 1022 can be configured to perform the overheating protection method for user equipment described above.

In an exemplary embodiment, there is also provided a non-transitory computer readable storage medium including instructions executable by the processing component 1022 of the device 1000 to perform the above method. For example, the non-transitory computer readable storage medium can be a ROM, a random access memory (RAM), a CD-ROM, a magnetic tape, a floppy disk, and an optical data storage device.

A non-transitory computer readable storage medium, when instructions in the storage medium are executed by a processor of the base station, enabling the base station to perform the overheating protection method for user equipment disclosed in the second aspect above. The method includes:

receiving a first signaling sent by user equipment, the first signaling carrying indication information indicating that the user equipment has a capability of reporting a temporary capability of the user equipment;

when the base station supports an overheating solving capability for the user equipment, generating a second signaling, the second signaling carrying indication information indicating the user equipment to report the temporary capability of the user equipment when the user equipment is overheated; and sending the second signaling.

Figure 11:
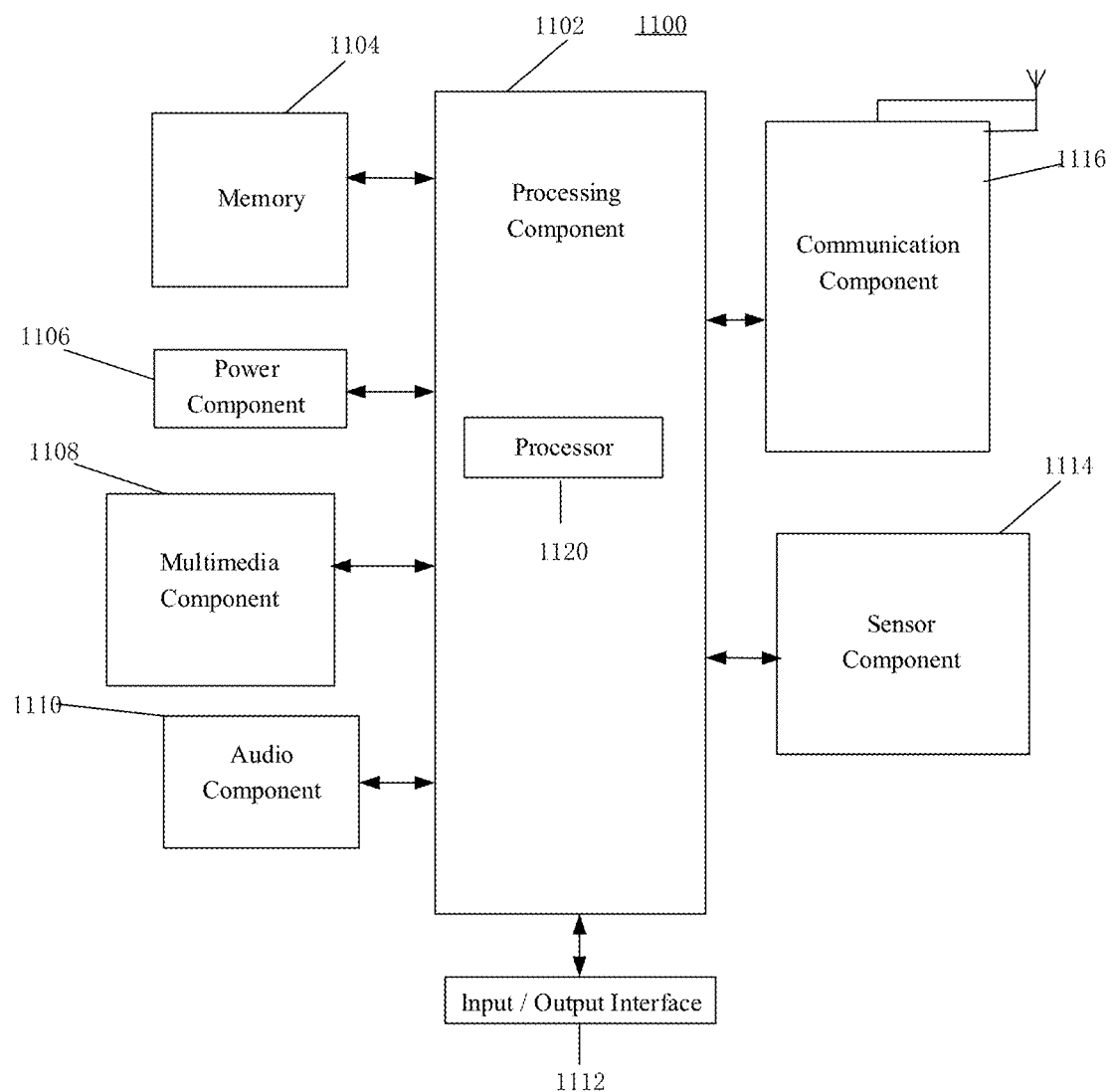
FIG. 11 is a block diagram of an overheating protection device suitable for user equipment according to an exemplary embodiment.

FIG. 11 is a block diagram of an overheating protection device suitable for user equipment according to an exemplary embodiment. For example, the device 1100 may be a first device, such as a smart phone.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, phone call, data communications, camera operations, and recording operations. The processing component 1102 may include one or more processors 1120 to execute instructions, to perform all or part of the steps of the above method. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, telephone directory data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. When the device 1100 is in an operation mode, such as a shooting mode or a video mode, the front camera and/or the rear camera can receive external multimedia data. Each front and rear camera can be a fixed optical lens system or have focal length and optical zoom capability The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. These buttons may include, but are not limited to, a home button, a volume button, a start button, and a lock button.

The sensor component 1114 includes one or more sensors to provide status assessments of various aspects of the device 1100. For instance, the sensor component 1114 may detect an on/off status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a BLUETOOTH® (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the overheating protection method for user equipment.

In exemplary embodiments, there is also provided a non-transitory computer-readable storage medium including instructions, such as included in the memory 1104, executable by the processor 1120 in the device 1100 to perform the above method. For example, the non-transitory computer-readable storage medium may be a ROM, a random access memory (RAM), a CD-ROM, a magnetic tape, a floppy disc, an optical data storage device, and the like.

A non-transitory computer readable storage medium, when instructions in the storage medium are executed by a processor of the device, enabling the device to perform the overheating protection method for user equipment disclosed in the first aspect above. The method includes:

sending a first signaling to a base station, the first signaling carrying indication information indicating that the user equipment has a capability of reporting a temporary capability of the user equipment;

monitoring whether the base station returns a second signaling in response to the first signaling within a preset time period; and based on the monitoring result, determining whether the base station has an overheating solving capability for the user equipment.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An overheating protection method for user equipment, applied to user equipment, the method comprising:
   sending a first signaling to a base station, the first signaling carrying indication information indicating that the user equipment has a capability of reporting a temporary capability of the user equipment;
   monitoring whether the base station returns a second signaling in response to the first signaling within a preset time period;
   based on a monitoring result, determining whether the base station has an overheating solving capability for the user equipment; and
   upon determining that the base station has an overheating solving capability for the user equipment, when the user equipment is overheated due to a wireless link configuration being too high, sending a third signaling for adjusting the wireless link configuration to the base station, the third signaling carrying assistance information indicating the base station to solve an overheating problem of the user equipment.

2. The method according to claim 1, wherein based on the monitoring result, determining whether the base station has an overheating solving capability for the user equipment comprises:
   when the monitoring result is that the second signaling is monitored, determining that the base station has the overheating solving capability for the user equipment; and
   when the monitoring result is that no second signaling is monitored, determining that the base station does not have the overheating solving capability for the user equipment.

3. The method according to claim 2, wherein the second signaling carries indication information indicating the user equipment to report a temporary capability of the user equipment when the user equipment is overheated.

4. The method according to claim 1, wherein the assistance information comprises at least one of:
   indication information of lower performance due to overheating;
   a temporary user equipment capability due to overheating, which is represented by a user equipment type; or
   a temporary user equipment capability due to overheating, which is represented by a radio frequency parameter.

5. The method according to claim 1, further comprising:
   parsing the second signaling to obtain a time period length of an overheating prevention timer; and
   based on the time period length, determining a sending time for resending a signaling for adjusting the wireless link configuration to the base station after the third signaling is sent.

6. An overheating protection method for user equipment, applied to a base station, the method comprising:
   receiving a first signaling sent by the user equipment, the first signaling carrying indication information indicating that the user equipment has a capability of reporting a temporary capability of the user equipment;
   when the base station supports an overheating solving capability for the user equipment, generating a second signaling, the second signaling carrying indication information indicating the user equipment to report the temporary capability of the user equipment when the user equipment is overheated;
   sending the second signaling;
   receiving a third signaling sent by the user equipment;
   parsing the third signaling to obtain assistance information indicating to solve an overheating problem of the user equipment; and
   adjusting a wireless link configuration of the user equipment based on the assistance information.

7. The method according to claim 6, wherein the second signaling further carries a time period length of an overheating prevention timer.

8. The method according to claim 6, further comprising:
   when the base station does not support the overheating solving capability for the user equipment, rejecting sending the second signaling to the user equipment.

9. The method according to claim 6, wherein the assistance information comprises:
   indication information of lower performance due to overheating; and/or a temporary user equipment capability due to overheating, which is represented by a user equipment type; and/or a temporary user equipment capability due to overheating, which is represented by a radio frequency parameter.

10. User equipment, comprising:
    a communication component;
    a processor; and
    a memory storing instructions executable by the processor;
    wherein the processor is configured to:
    send, via the communication component, a first signaling to a base station, the first signaling carrying indication information indicating that the user equipment has a capability of reporting a temporary capability of the user equipment;
    monitor whether the base station returns a second signaling in response to the first signaling within a preset time period;

based on a monitoring result, determine whether the base station has an overheating solving capability for the user equipment; and upon determining that the base station has an overheating solving capability for the user equipment, when the user equipment is overheated due to a wireless link configuration being too high, send, via the communication component, a third signaling for adjusting the wireless link configuration to the base station, the third signaling carrying assistance information indicating the base station to solve an overheating problem of the user equipment.

11. The user equipment according to claim 10, wherein the processor is further configured to:

when the monitoring result is that the second signaling is monitored, determine that the base station has the overheating solving capability for the user equipment; and when the monitoring result is that no second signaling is monitored, determine that the base station does not have the overheating solving capability for the user equipment.

12. The user equipment according to claim 11, wherein the second signaling carries indication information indicating the user equipment to report a temporary capability of the user equipment when the user equipment is overheated.

13. The user equipment according to claim 10, wherein the assistance information comprises at least one of:

indication information of lower performance due to overheating;

a temporary user equipment capability due to overheating, which is represented by a user equipment type; or a temporary user equipment capability due to overheating, which is represented by a radio frequency parameter.

14. The user equipment according to claim 10, wherein the processor is further configured to:

parse the second signaling to obtain a time period length of an overheating prevention timer; and based on the time period length, determine a sending time for resending a signaling for adjusting the wireless link configuration to the base station after the third signaling is sent.

* * * * *